(12) United States Patent
Kamei et al.

(10) Patent No.: US 10,434,960 B2
(45) Date of Patent: Oct. 8, 2019

(54) MEMBER ATTACHMENT STRUCTURE AND ATTACHMENT CLIP

(71) Applicants: NIFCO INC., Yokosuka-shi, Kanagawa (JP); TOYOTA JIDOSHA KABUSHIKI KAISHA, Toyota-shi, Aichi-ken (JP)

(72) Inventors: Masatoshi Kamei, Yokosuka (JP); Atsushi Usami, Toyota (JP); Masayuki Amano, Toyota (JP)

(73) Assignees: NIFCO INC., Yokosuka-shi (JP); TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 15/850,448

(22) Filed: Dec. 21, 2017

(65) Prior Publication Data

US 2018/0178735 A1    Jun. 28, 2018

(30) Foreign Application Priority Data

Dec. 28, 2016    (JP) ................................ 2016-256023

(51) Int. Cl.
*B60R 13/04*      (2006.01)
*F16B 17/00*      (2006.01)
(Continued)

(52) U.S. Cl.
CPC ............... *B60R 13/04* (2013.01); *F16B 2/22* (2013.01); *F16B 17/00* (2013.01); *F16B 21/075* (2013.01);
(Continued)

(58) Field of Classification Search
CPC ... B60R 13/04; B60Y 2410/113; F16B 17/00; F16B 2/22
See application file for complete search history.

(56) References Cited

U.S. PATENT DOCUMENTS 5,966,782 A * 10/1999 Ishihara ................ F16B 5/0614
                                                       24/289
6,074,150 A * 6/2000 Shinozaki ........... B60R 13/0206
                                                       24/297

(Continued)

FOREIGN PATENT DOCUMENTS

JP    2002-155916 A    5/2002
JP    2003-222114 A    8/2003
(Continued)

OTHER PUBLICATIONS

Apr. 22, 2019 Office Action issued in Chinese Patent Application No. 201711425971.0.

*Primary Examiner* — Robert Sandy
*Assistant Examiner* — David M Upchurch
(74) *Attorney, Agent, or Firm* — Oliff PLC (57) ABSTRACT

A member attachment structure includes: a first member on which an attachment portion equipped with an engaged portion is provided; a second member in which an attachment hole is provided; and an attachment clip equipped with a distal end portion, a pair of plate-shaped portions are disposed opposing each other with the attachment portion of the first member being inserted therebetween, an engaging portion engages with the engaged portion, an engaging claw portion engages with an edge portion of the attachment hole, and a projecting portion that is provided on the opposing surface of the plate-shaped portion and projects, in an opposing direction in which the pair of plate-shaped portions oppose each other, from an end portion side in a width direction orthogonal to a direction in which the at least one plate-shaped portion extends.

9 Claims, 10 Drawing Sheets

(51) Int. Cl.
 *F16B 2/22* (2006.01)
 *F16B 21/07* (2006.01)
 *F16B 5/06* (2006.01)

(52) U.S. Cl.
 CPC ....... *B60Y 2410/113* (2013.01); *F16B 5/0614* (2013.01)

(56) References Cited

U.S. PATENT DOCUMENTS

| | | | | |
|---|---|---|---|---|
| 6,101,686 | A * | 8/2000 | Velthoven | F16B 5/065 24/289 |
| 6,141,837 | A * | 11/2000 | Wisniewski | F16B 5/0614 24/289 |
| 6,449,814 | B1 * | 9/2002 | Dinsmore | F16B 5/065 24/289 |
| 7,344,331 | B2 * | 3/2008 | Kobayashi | B60R 13/04 24/297 |
| 7,401,388 | B2 * | 7/2008 | Hansen | F16B 5/0614 24/292 |
| 7,461,436 | B2 * | 12/2008 | Asano | B60R 13/0206 24/297 |
| 7,536,755 | B2 * | 5/2009 | Nakajima | F16B 5/065 24/297 |
| 7,862,273 | B2 * | 1/2011 | Ooyama | F16B 5/065 411/45 |
| 8,056,193 | B2 * | 11/2011 | Park | F16B 5/0614 24/297 |
| 8,567,017 | B2 * | 10/2013 | Iwahara | F16B 5/065 24/297 |
| 8,683,662 | B2 * | 4/2014 | Cooley | F16B 5/065 24/297 |
| 8,793,845 | B2 * | 8/2014 | Benedetti | F16B 5/065 24/292 |
| D759,476 | S * | 6/2016 | Iwahara | D8/395 |
| 9,488,202 | B2 * | 11/2016 | Komeno | B60R 13/0206 |
| 9,630,572 | B2 * | 4/2017 | Iwahara | B60R 13/0206 |
| 2005/0116485 | A1 * | 6/2005 | Kuroda | B60R 13/0206 296/1.08 |
| 2005/0155191 | A1 * | 7/2005 | Asano | B60R 13/0206 24/297 |
| 2013/0145585 | A1 * | 6/2013 | Watanabe | F16B 19/1081 24/595.1 |
| 2013/0199003 | A1 * | 8/2013 | Iwahara | F16B 2/22 24/530 |
| 2014/0000071 | A1 * | 1/2014 | Choi | F16B 21/075 24/543 |
| 2015/0321622 | A1 * | 11/2015 | Dickinson | B60R 13/0206 24/458 |

FOREIGN PATENT DOCUMENTS

| | | |
|---|---|---|
| JP | 2007-315467 A | 12/2007 |
| JP | 4101920 B2 | 6/2008 |
| JP | 2015-086928 A | 5/2015 |

* cited by examiner

MEMBER ATTACHMENT STRUCTURE AND ATTACHMENT CLIP

CROSS-REFERENCE TO RELATED APPLICATION

This application is based on and claims priority under 35 USC 119 from Japanese Patent Application No. 2016-256023 filed on Dec. 28, 2016, the disclosure of which is incorporated by reference herein.

BACKGROUND

Technical Field

The present disclosure relates to a member attachment structure and an attachment clip.

Related Art

Japanese Patent No. 4,101,920 discloses an attachment structure where an attachment portion provided on a second member is inserted, from an open side of a cross-sectionally V-shaped clip having a pair of plate-shaped portions that oppose each other, between and caused to engage with the pair of plate-shaped portions, and thereafter the clip is inserted into and caused to engage with an attachment hole provided in a first member, whereby the first member and the second member are attached to each other.

In the attachment structure disclosed in Japanese Patent No. 4,101,920, when inserting the attachment portion of the second member between the pair of plate-shaped portions from the open side of the clip, depending on the force with which one's fingers pinch the pair of plate-shaped portions from both sides, sometimes the free end portions side of the pair of plate-shaped portions move closer to each other, that is, the length of the open portion of the clip becomes smaller. When the length of the open portion of the clip becomes smaller in this way, it becomes difficult to insert the attachment portion into the open portion of the clip.

SUMMARY

In consideration of the circumstance described above, it is a problem of an aspect of the present disclosure to provide a member attachment structure and an attachment clip where, in a configuration where a first member and a second member are attached to each other via the attachment clip, the ability of an attachment portion provided on the first member and the attachment clip to be attached to each other is improved.

A member attachment structure of a first aspect of the disclosure includes: a first member on which an attachment portion equipped with an engaged portion is provided; a second member in which an attachment hole is provided and to which the first member becomes attached; and an attachment clip equipped with a distal end portion that is inserted into the attachment hole, a pair of plate-shaped portions that are elastically deformable, extend from the distal end portion toward an opposite side from an insertion direction, have free end portions located on the opposite side from the insertion direction, and are disposed opposing each other with the attachment portion being inserted therebetween, an engaging portion that is provided on an opposing surface of at least one plate-shaped portion of the pair of plate-shaped portions and that engages with the engaged portion, an engaging claw portion that is provided on an outer surface, located on an opposite side from the opposing surface, of the at least one plate-shaped portion and that engages with an edge portion of the attachment hole, and a projecting portion that is provided on the opposing surface of the at least one plate-shaped portion and projects, in an opposing direction in which the pair of plate-shaped portions oppose each other, from an end portion side in a width direction orthogonal to a direction in which the at least one plate-shaped portion extends.

In the member attachment structure of the first aspect, when the attachment portion of the first member is inserted from the free end portions side (the open side) between the pair of plate-shaped portions of the attachment clip, the engaging portion provided on the opposing surface of the plate-shaped portion engages with the engaged portion of the attachment portion. Because of this, the attachment clip is attached to the first member. Next, when the distal end portion of the attachment clip is inserted into the attachment hole and the distal end portion passes through the attachment hole, the engaging claw portion provided on the outer surface of the plate-shaped portion engages with the edge portion of the attachment hole. Because of this, the attachment clip is attached to the second member. That is, the first member and the second member are attached to each other via the attachment clip.

In this member attachment structure, even if the force with which one's fingers pinch the pair of plate-shaped portions is large when inserting the attachment portion from the open side between the pair of plate-shaped portions of the attachment clip, the distance between the free end portions of the pair of plate-shaped portions (the length of the open portion) is maintained as a result of the projecting portion of one of the plate-shaped portions coming into abutting contact with the other plate-shaped portion or the projecting portion of the other plate-shaped portion. That is, in this member attachment structure, the distance between the free end portions of the pair of plate-shaped portions (the length of the open portion) can be maintained compared to a configuration where the projecting portion is not provided on the plate-shaped portion, so it is easy to insert the attachment portion between the pair of plate-shaped portions of the attachment clip, and the ability of the attachment portion and the attachment clip to be attached to each other is improved.

A member attachment structure of a second aspect of the disclosure is the member attachment structure of the first aspect, wherein in a contact state in which the projecting portion provided on one of the plate-shaped portions of the attachment clip is in contact with the other plate-shaped portion or the projecting portion provided on the other plate-shaped portion, a distance between the free end portions of the pair of plate-shaped portions is equal to or greater than a thickness of a distal end portion of the attachment portion.

In the member attachment structure of the second aspect, when the attachment clip is in the contact state, the distance between the free end portions of the pair of plate-shaped portions (the length of the open portion) is equal to or greater than the thickness of the distal end portion of the attachment portion, so it is easy to insert the distal end portion of the attachment portion between the pair of plate-shaped portions.

A member attachment structure of a third aspect of the disclosure is the member attachment structure of the first aspect or the second aspect, wherein in an inserted state in which the attachment portion has been inserted between the pair of plate-shaped portions of the attachment clip, the projecting portion provided on one of the plate-shaped portions is separated from the other plate-shaped portion or the projecting portion provided on the other plate-shaped portion.

In the member attachment structure of the third aspect, when the attachment clip is in the inserted state, the projecting portion of one of the plate-shaped portions is separated from the other plate-shaped portion or the projecting portion of the other plate-shaped portion, so abnormal sounds can be kept from being produced by the projecting portion of one of the plate-shaped portions coming into contact with the other plate-shaped portion or the projecting portion of the other plate-shaped portion.

A member attachment structure of a fourth aspect of the disclosure is the member attachment structure of any one of the first aspect to the third aspect, wherein when inserting the attachment portion between the pair of plate-shaped portions, the projecting portion guides an outer surface of the attachment portion.

In the member attachment structure of the fourth aspect, when inserting the attachment portion between the pair of plate-shaped portions of the attachment clip, the projecting portion guides the outer surface of the attachment portion, so it is easy to insert the attachment portion between the pair of plate-shaped portions. Furthermore, the hole wall surface of the attachment hole and the outer surface of the attachment portion can be kept by the projecting portion from contacting each other, so abnormal sounds can be kept from being produced by contact.

A member attachment structure of a fifth aspect of the disclosure is the member attachment structure of any one of the first aspect to the fourth aspect, wherein the projecting portion is provided on a free end portion side of the plate-shaped portion.

In the member attachment structure of the fifth aspect, the projecting portion is provided on the free end portion side of the plate-shaped portion, so compared, for example, to a configuration where the projecting portion is provided on the opposite side from the free end portion of the plate-shaped portion (the distal end portion side of the attachment clip), the distance between the free end portions of the pair of plate-shaped portions—in other words, the length of the insertion opening (the entrance of the open portion) in the attachment clip—can be reliably maintained.

A member attachment structure of a sixth aspect of the disclosure is the member attachment structure of any one of the first aspect to the fifth aspect, wherein a cantilever-like elastic plate portion elastically deformable in a plate thickness direction because of slits is formed in the at least one plate-shaped portion, and the engaging claw portion is provided on an outer surface of the elastic plate portion.

In the member attachment structure of the sixth aspect, when the engaging claw portion comes into abutting contact with the hole wall surface of the attachment hole when inserting the attachment clip into the attachment hole, the elastic plate portion flexes in the opposing direction of the plate-shaped portion. After the engaging claw portion has passed through the attachment hole, the elastic plate portion returns to its original state because of repulsive force (restoring force), and the engaging claw portion engages with the edge portion of the attachment hole. Here, in this member attachment structure, the cantilever-like elastic plate portion elastically deformable in the plate thickness direction because of the slits is formed in the plate-shaped portion, and the engaging claw portion is formed on the elastic plate portion, so the engaging claw portion can be reliably caused to engage with the edge portion of the attachment hole while reducing the force with which the attachment clip is inserted into the attachment hole.

A member attachment structure of a seventh aspect of the disclosure is the member attachment structure of the sixth aspect, wherein the engaged portion is a through hole that runs through the attachment portion in a thickness direction thereof, and the engaging portion is a projection provided on the opposing surface of the elastic plate portion.

In the member attachment structure of the seventh aspect, the projection that is the engaging portion is provided on the opposing surface of the elastic plate portion, so when inserting the attachment portion between the pair of plate-shaped portions, the elastic plate portion flexes toward the opposite side from the opposing direction of the plate-shaped portion via the projection that has come into abutting contact with the attachment portion. After the projection has reached the through hole in the attachment portion, the elastic plate portion returns to its original state because of repulsive force (restoring force), and the projection engages with the edge portion of the through hole. Here, in this member attachment structure, the projection is formed on the elastic plate portion, so the projection can be reliably caused to engage with the edge portion of the through hole while reducing the force with which the attachment portion is inserted into the attachment clip. Furthermore, the projection is formed on the elastic plate portion on which the engaging claw portion is provided, so the structure of the attachment clip can be simplified compared, for example, to a configuration where the elastic plate portion is provided on separate parts of the plate-shaped portion.

A member attachment structure of an eighth aspect of the disclosure is the member attachment structure of any one of the first aspect to the seventh aspect, wherein a coefficient of friction between an outer surface of the attachment clip and a hole wall surface of the attachment hole and a coefficient of friction between an inner surface of the attachment clip and an outer surface of the attachment portion are smaller than a coefficient of friction between the outer surface of the attachment portion and the hole wall surface of the attachment hole.

In the member attachment structure of the eighth aspect, the coefficient of friction between the outer surface of the attachment clip and the hole wall surface of the attachment hole and the coefficient of friction between the inner surface of the attachment clip and the outer surface of the attachment portion are smaller than the coefficient of friction between the outer surface of the attachment portion and the hole wall surface of the attachment hole. For this reason, in this member attachment structure, compared, for example, to abnormal sounds produced by friction between the outer surface of the attachment portion and the hole wall surface of the attachment hole, abnormal sounds produced by friction between the outer surface of the attachment clip and the hole wall surface of the attachment hole and abnormal sounds produced by friction between the inner surface of the attachment clip and the outer surface of the attachment portion can be decreased.

An attachment clip of a ninth aspect of the disclosure is an attachment clip for attaching to each other a first member on which an attachment portion equipped with an engaged portion is provided and a second member in which an attachment hole is provided and to which the first member becomes attached, the attachment clip including: a distal end portion that is inserted into the attachment hole; a pair of plate-shaped portions that are elastically deformable, extend from the distal end portion toward an opposite side from an insertion direction, have free end portions located on the opposite side from the insertion direction, and are disposed opposing each other with the attachment portion being inserted therebetween; an engaging portion that is provided on an opposing surface of at least one plate-shaped portion of the pair of plate-shaped portions and that engages with the engaged portion; an engaging claw portion that is provided on an outer surface, located on an opposite side from the opposing surface, of the at least one plate-shaped portion and that engages with an edge portion of the attachment hole; and a projecting portion that is provided on the opposing surface of the at least one plate-shaped portion and projects, in an opposing direction in which the pair of plate-shaped portions oppose each other, from an end portion side in a width direction orthogonal to a direction in which the at least one plate-shaped portion extends.

In the attachment clip of the ninth aspect, when the attachment portion of the first member is inserted from the free end portions side (the open portion side) between the pair of plate-shaped portions, the engaging portion provided on the opposing surface of the plate-shaped portion engages with the engaged portion of the attachment portion. Because of this, the first member is attached to the attachment clip. Next, when the distal end portion of the attachment clip is inserted into the attachment hole and the distal end portion passes through the attachment hole, the engaging claw portion provided on the outer surface of the plate-shaped portion engages with the edge portion of the attachment hole. Because of this, the attachment clip is attached to the second member. That is, the first member and the second member are attached to each other via the attachment clip.

In this attachment clip, even if the force with which one's fingers pinch the pair of plate-shaped portions is large when inserting the attachment portion from the open side between the pair of plate-shaped portions of the attachment clip, the distance between the free end portions of the pair of plate-shaped portions (the length of the open portion) is maintained as a result of the projecting portion of one of the plate-shaped portions coming into abutting contact with the other plate-shaped portion or the projecting portion of the other plate-shaped portion. That is, in this attachment clip, the distance between the free end portions of the pair of plate-shaped portions (the length of the open portion) can be maintained compared to a configuration where the projecting portion is not provided on the plate-shaped portion, so it is easy to insert the attachment portion between the pair of plate-shaped portions of the attachment clip, and the ability of the attachment portion and the attachment clip to be attached to each other is improved.

According to the aspect of the disclosure, there can be provided a member attachment structure and an attachment clip where, in a configuration where a first member and a second member are attached to each other via the attachment clip, the ability of an attachment portion provided on the first member and the attachment clip to be attached to each other is improved.

BRIEF DESCRIPTION OF THE DRAWINGS

An exemplary embodiment of the present invention will be described in detail based on the following figures, wherein.

DETAILED DESCRIPTION

Next, a member attachment structure and an attachment clip pertaining to an embodiment of the present disclosure will be described using FIG. 1 to FIG. 10.

Figure 1:
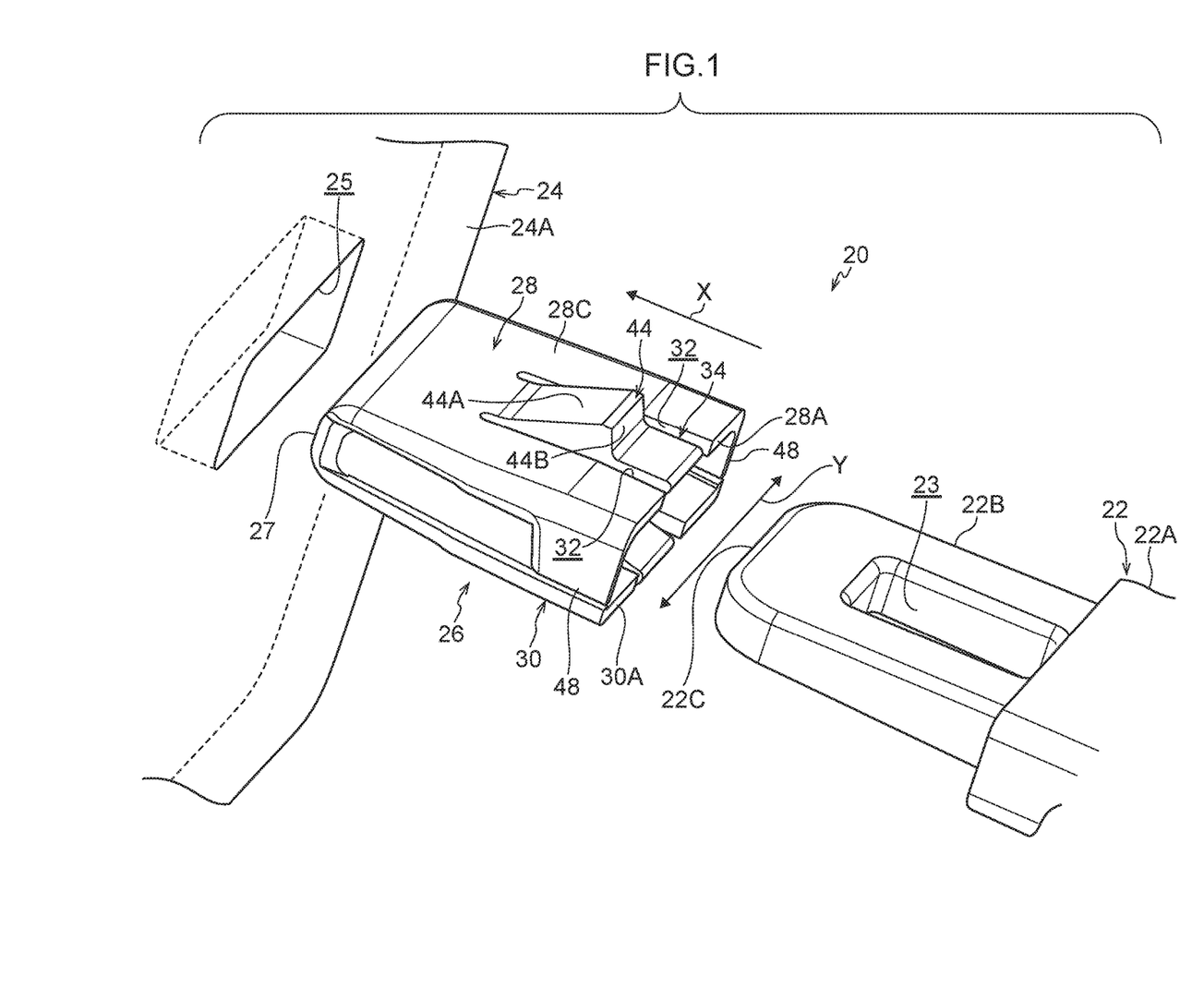
FIG. 1 is an exploded perspective view of a member attachment structure pertaining to the embodiment.
Figure 2:
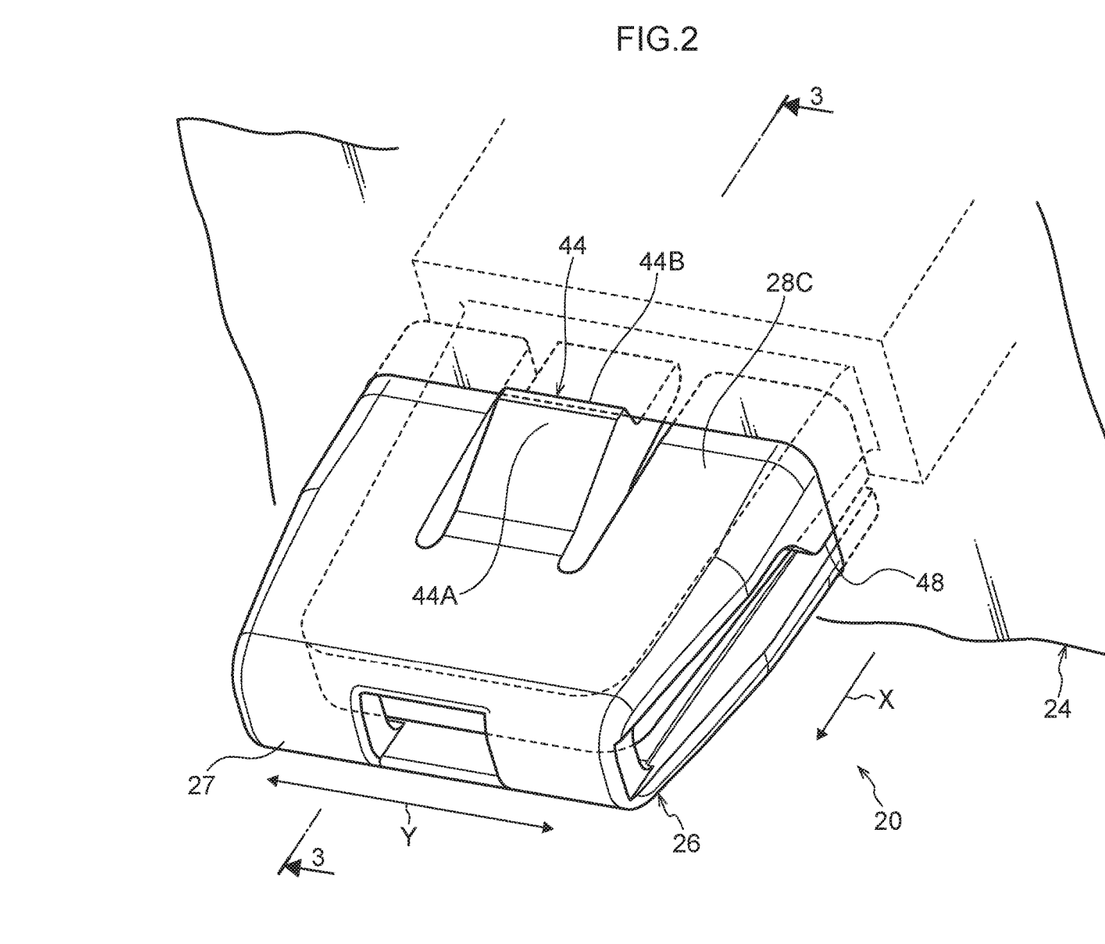
FIG. 2 is a perspective view of the member attachment structure shown in FIG. 1 as seen from the opposite side from an insertion direction of an attachment clip.
Figure 3:
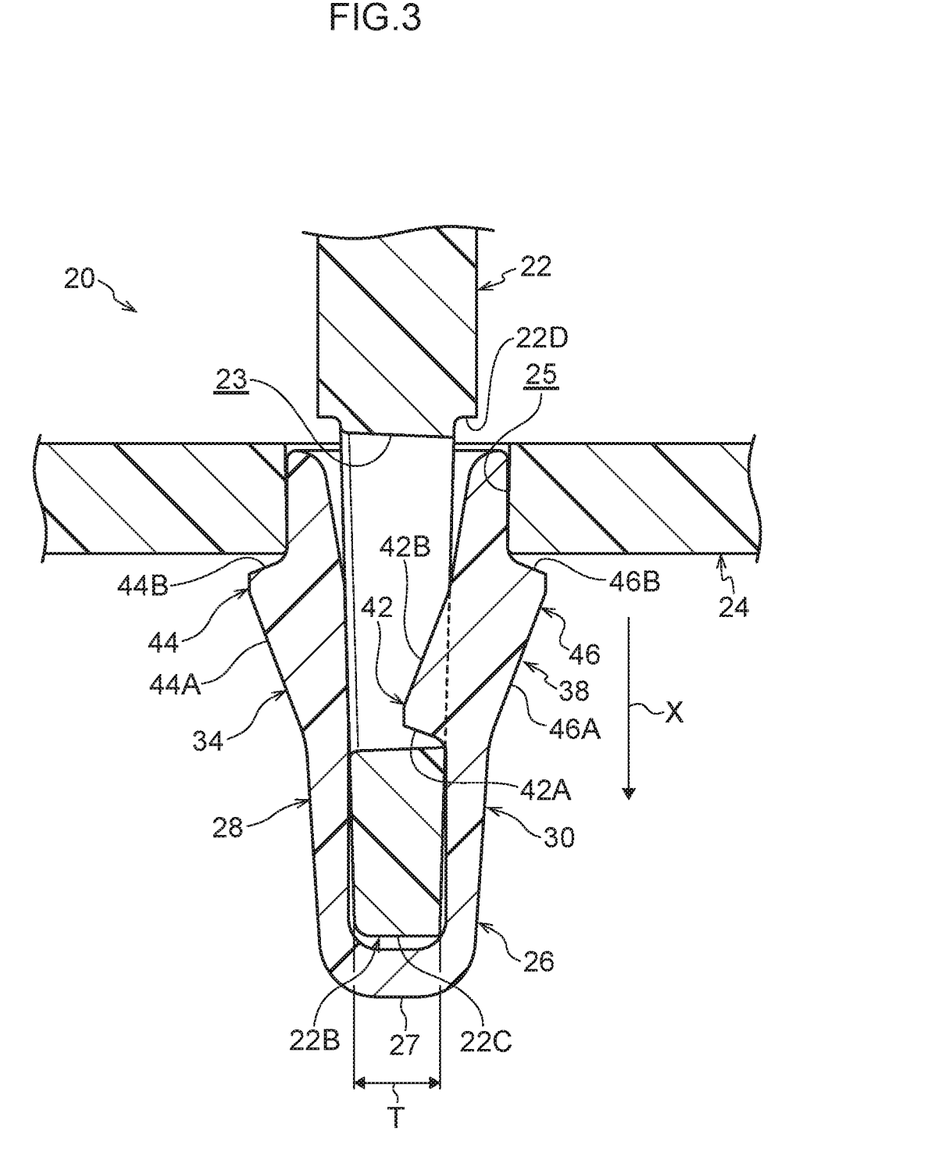
FIG. 3 is a sectional view along line 3-3 of FIG. 2.

As shown in FIG. 1 to FIG. 3, a member attachment structure 20 of the present embodiment has a plated component 22 serving as an example of a first member, a front member 24 serving as an example of a second member, and an attachment clip 26 for attaching the plated component 22 to the front member 24.

(Plated Component 22)

The plated component 22 is an automobile exterior component attached via the attachment clip 26 to the front member 24. The plated component 22 has a body portion 22A (see FIG. 1), which has a design surface not shown in the drawings, and a thick plate-shaped attachment portion 22B, which is disposed erectly on a back side of the body portion 22A. As shown in FIG. 3, the attachment portion 22B has a thickness T that gradually increases from a distal end portion 22C toward a base portion 22D. It will be noted that the present disclosure is not limited to this configuration, and the thickness T of the attachment portion 22B may also be constant from the distal end portion 22C to the base portion 22D. Furthermore, a through hole 23 that runs through the attachment portion 22B in a thickness direction thereof is formed in the attachment portion 22B. The through hole 23 is an example of an engaged portion in the present disclosure.

(Front Member 24)

The front member 24 is an automobile exterior component configuring a front portion of an automobile. As shown in FIG. 1 and FIG. 2, a plate-shaped portion 24A is formed in the front member 24, and an attachment hole 25 is formed in the plate-shaped portion 24A. Furthermore, examples of the resin material forming the front member 24 of the present embodiment include polypropylene (PP).

(Attachment Clip 26)

As shown in FIG. 1 to FIG. 10, the attachment clip 26 is a component for attaching the plated component 22 and the front member 24 to each other, and is an integrally molded article made of resin.

As shown in FIG. 1 and FIG. 3, the attachment clip 26 is equipped with a distal end portion 27, which is inserted into the attachment hole 25, and a pair of plate-shaped portions 28 and 30, which are elastically deformable and extend from the distal end portion 27 toward the opposite side from the clip insertion direction (the direction indicated by arrow X in the drawings). It will be noted that although the attachment clip 26 of the present embodiment is substantially U-shaped as seen in a side view, the present disclosure is not limited to this configuration. For example, the attachment clip 26 may also be substantially V-shaped, or U-shaped with a flat bottom, as seen in a side view.

Figure 6:
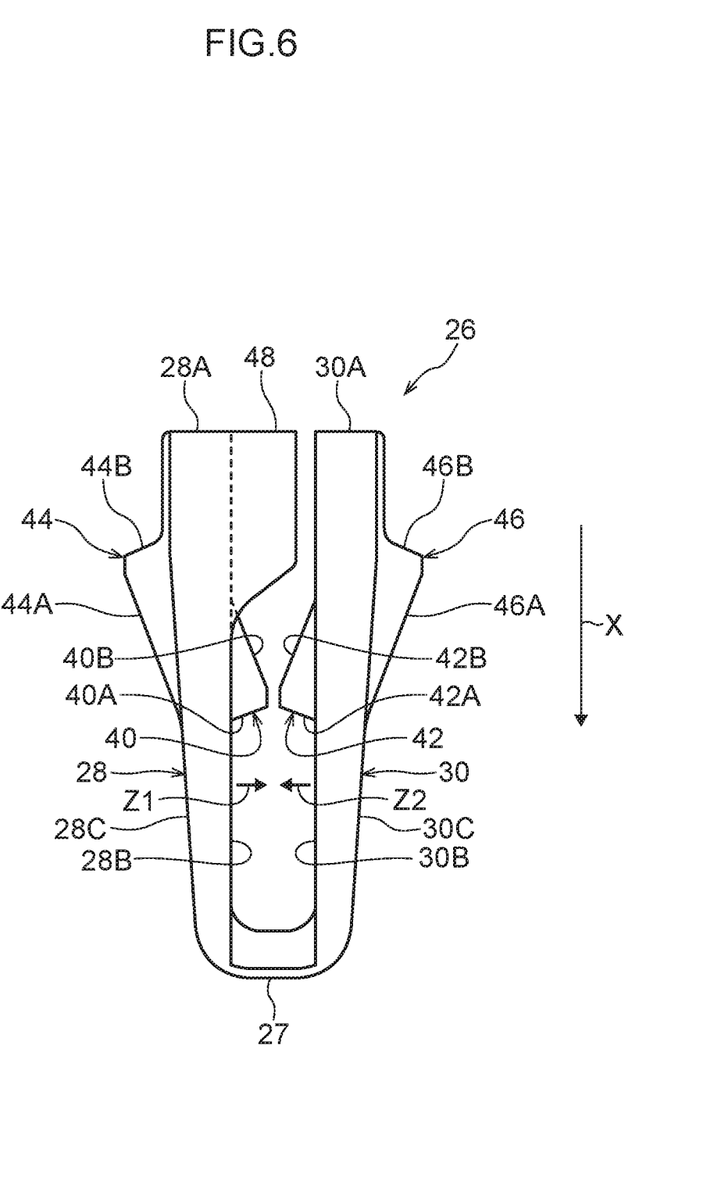
FIG. 6 is a side view of the attachment clip shown in FIG. 4.

As shown in FIG. 3 and FIG. 6, end portions 28A and 30A of the pair of plate-shaped portions 28 and 30 on the opposite side from the clip insertion direction X are free end portions. Furthermore, the pair of plate-shaped portions 28 and 30 are disposed opposing each other, and the attachment portion 22B is inserted between them (see FIG. 3).

Figure 4:
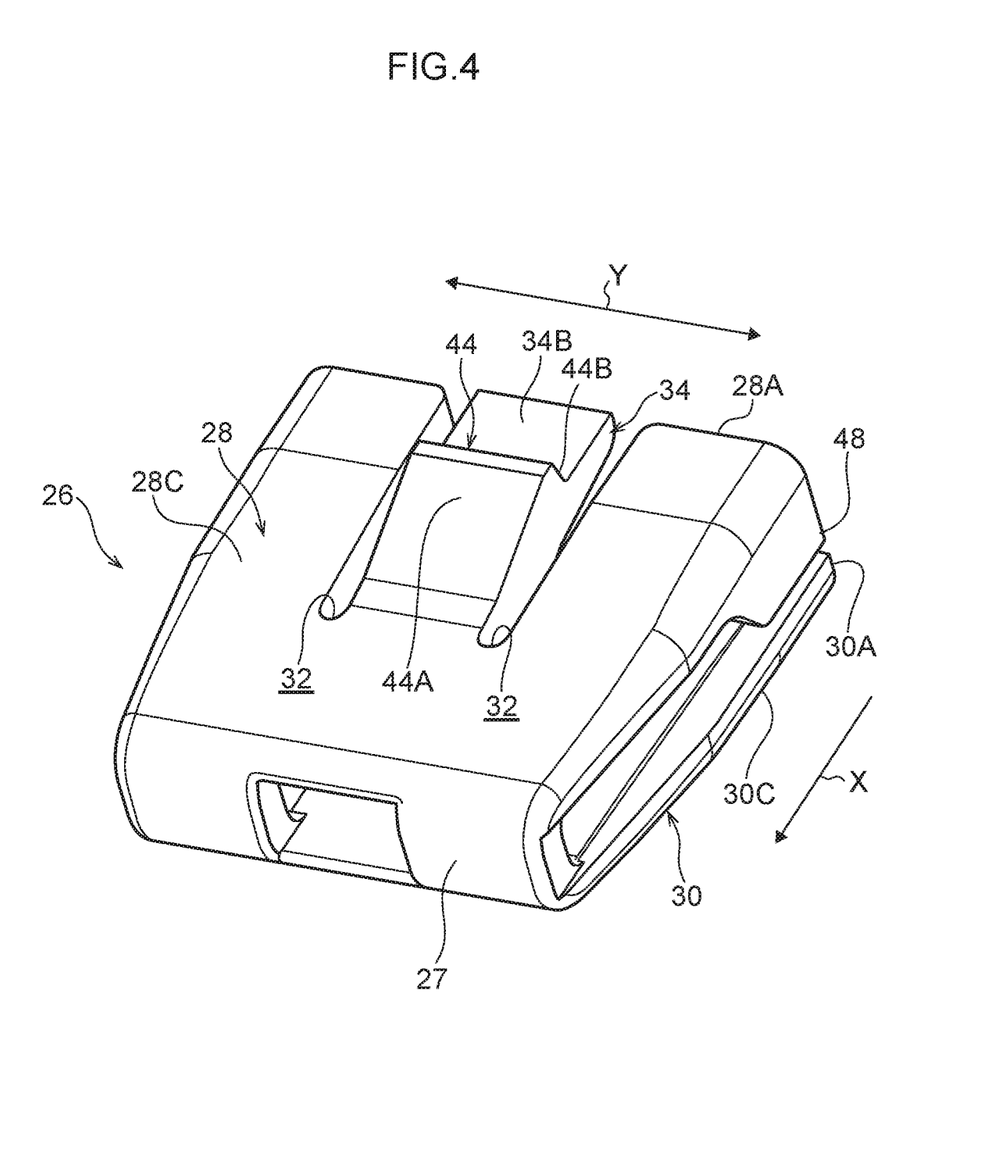
FIG. 4 is a perspective view of the attachment clip pertaining to the embodiment.
Figure 5:
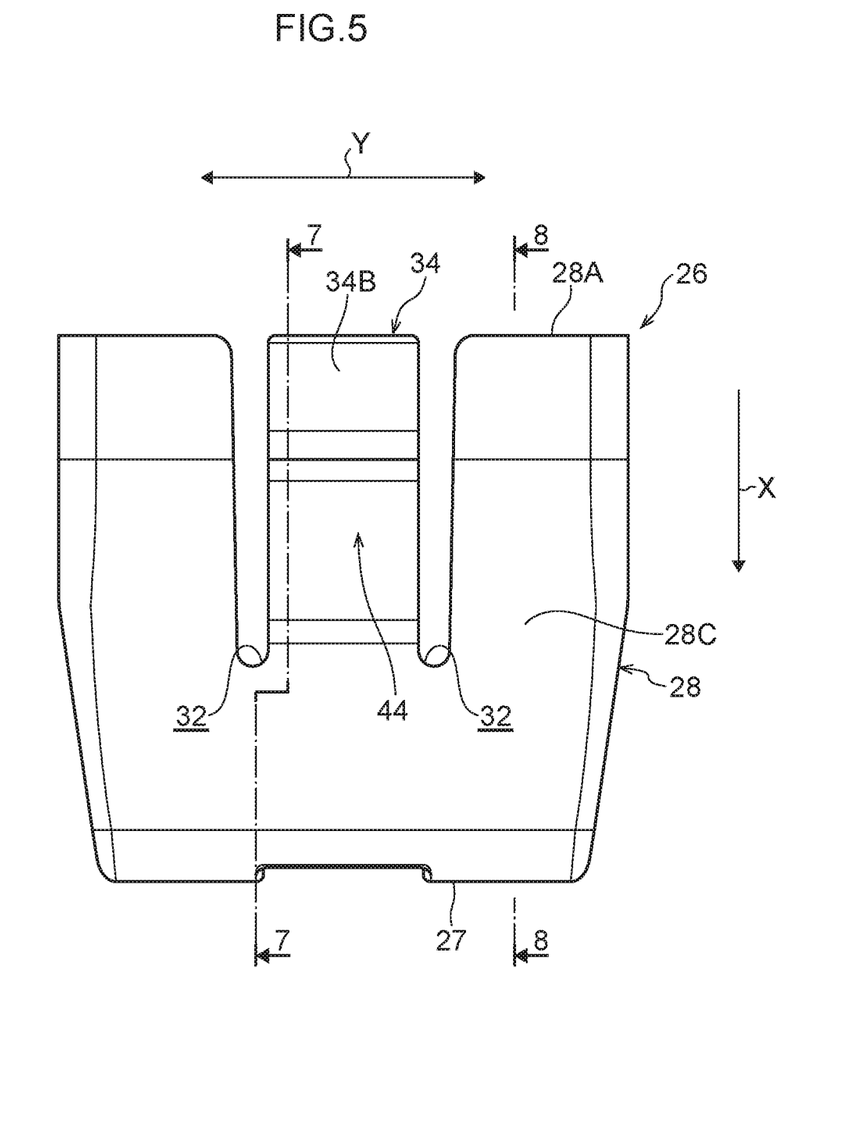
FIG. 5 is a plan view of the attachment clip shown in FIG. 4.

As shown in FIG. 4 and FIG. 5, a pair of slits 32 are provided in the plate-shaped portion 28 so as to be spaced apart from each other in the clip width direction (the direction indicated by arrow Y in the drawings) which is orthogonal to the direction in which the plate-shaped portion 28 extends (in the present embodiment, the opposite direction of the clip insertion direction). The slits 32 extend from the end portion 28A of the plate-shaped portion 28 toward the distal end portion 27. A cantilever-like elastic plate portion 34 elastically deformable in the plate thickness direction of the plate-shaped portion 28 is formed in the plate-shaped portion 28 between the pair of slits 32.

A pair of slits 36 (see FIG. 9) are provided in the plate-shaped portion 30 so as to be spaced apart from each other in the clip width direction which is orthogonal to the direction in which the plate-shaped portion 30 extends (in the present embodiment, the opposite direction of the clip insertion direction). The slits 36 extend from the end portion 30A of the plate-shaped portion 30 toward the distal end portion 27. A cantilever-like elastic plate portion 38 elastically deformable in the plate thickness direction of the plate-shaped portion 30 is formed in the plate-shaped portion 30 between the pair of slits 36.

Figure 9:
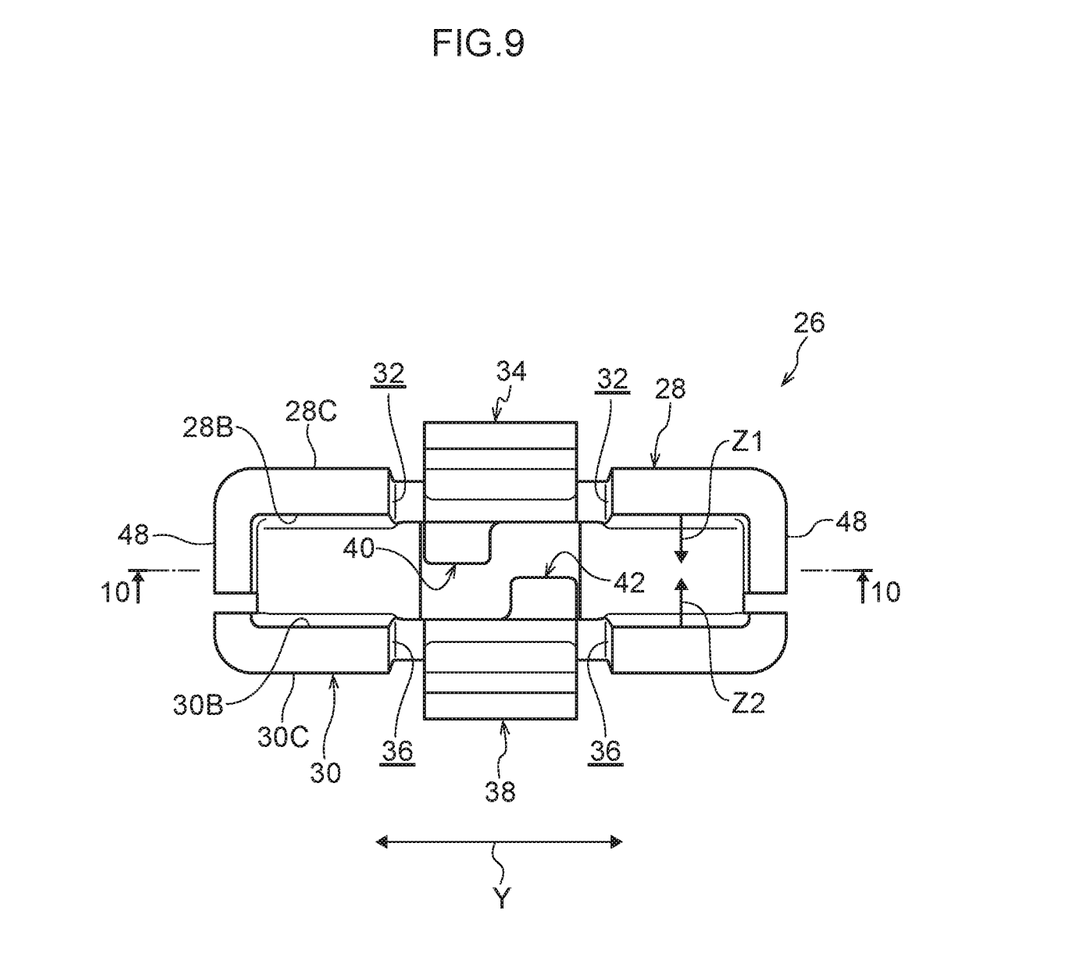
FIG. 9 is a back view of the attachment clip shown in FIG. 4 as seen from an open portion side.

Furthermore, as shown in FIG. 6 and FIG. 9, the attachment clip 26 is equipped with projections 40 and 42 serving as an example of engaging portions that are respectively provided on opposing surfaces 28B and 30B of the pair of plate-shaped portions 28 and 30 and engage with the through hole 23 in the attachment portion 22B.

Figure 10:
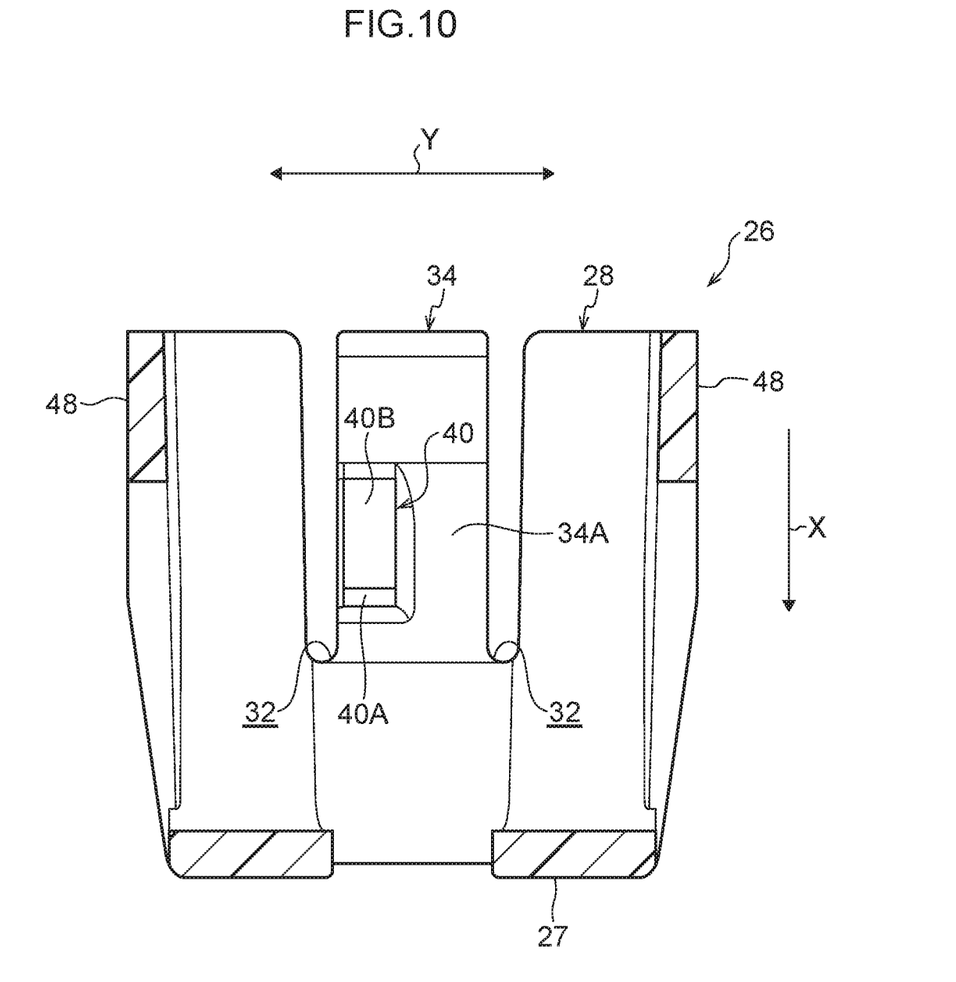
FIG. 10 is a sectional view along line 10-10 of FIG. 9.

As shown in FIG. 10, the projection 40 is provided on an inner surface 34A of the elastic plate-shaped portion 34 configuring part of the opposing surface 28B of the plate-shaped portion 28. As shown in FIG. 6, the projection 40 projects in a direction heading from the plate-shaped portion 28 toward the plate-shaped portion 30 (an opposing direction of the plate-shaped portion 28). It will be noted that what are called opposing directions of the plate-shaped portions 28 and 30 are the direction heading from the plate-shaped portion 28 toward the opposing plate-shaped portion 30 when seen from the plate-shaped portion 28 (the direction of arrow Z1 in FIG. 8) and the direction heading from the plate-shaped portion 30 toward the opposing plate-shaped portion 28 when seen from the plate-shaped portion 30 (the direction of arrow Z2 in FIG. 8). Furthermore, the projection 40 is formed substantially in the shape of a chevron as seen from the clip width direction Y, and the angle of inclination that an inclined surface 40A on the clip insertion direction side forms with respect to the opposing surface 28B is greater than the angle of inclination that an inclined surface 40B on the opposite side forms with respect to the opposing surface 28B. It will be noted that the inclined surface 40A is an engaging surface that engages with the edge portion of the through hole 23 in the attachment portion 22B.

Figure 7:
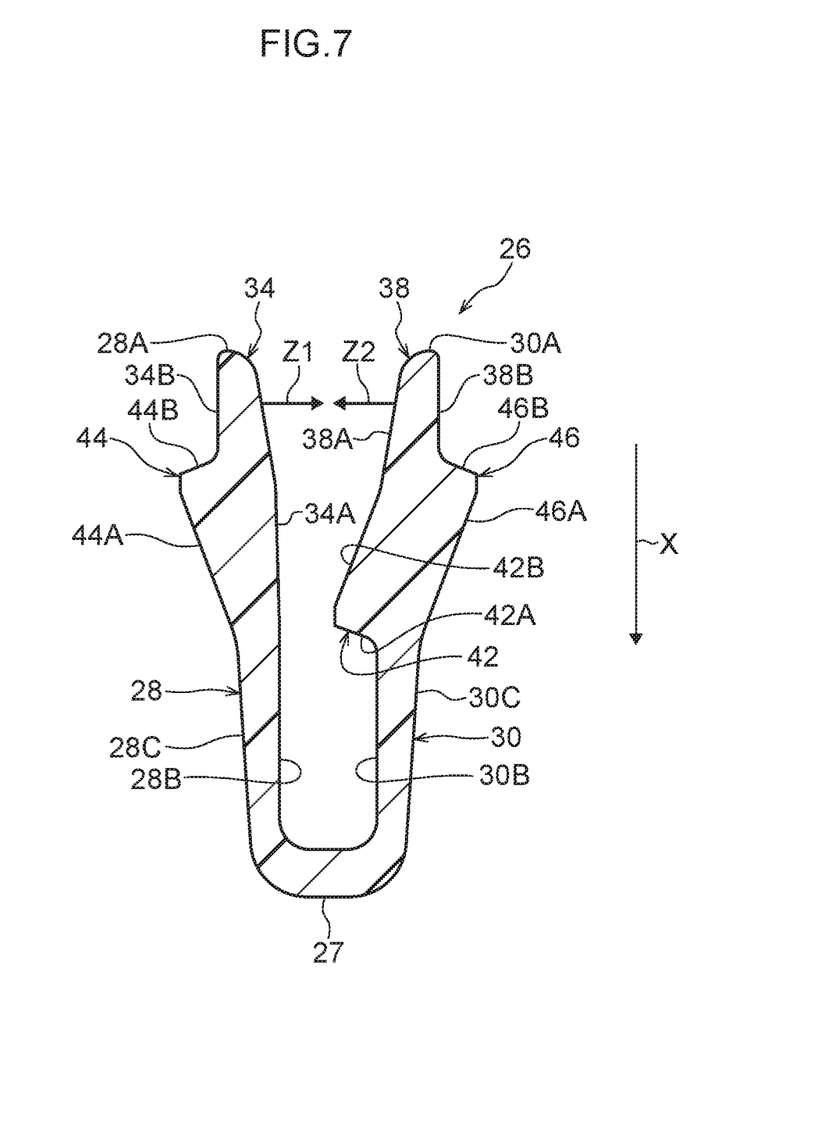
FIG. 7 is a sectional view along line 7-7 of FIG. 5.
Figure 8:
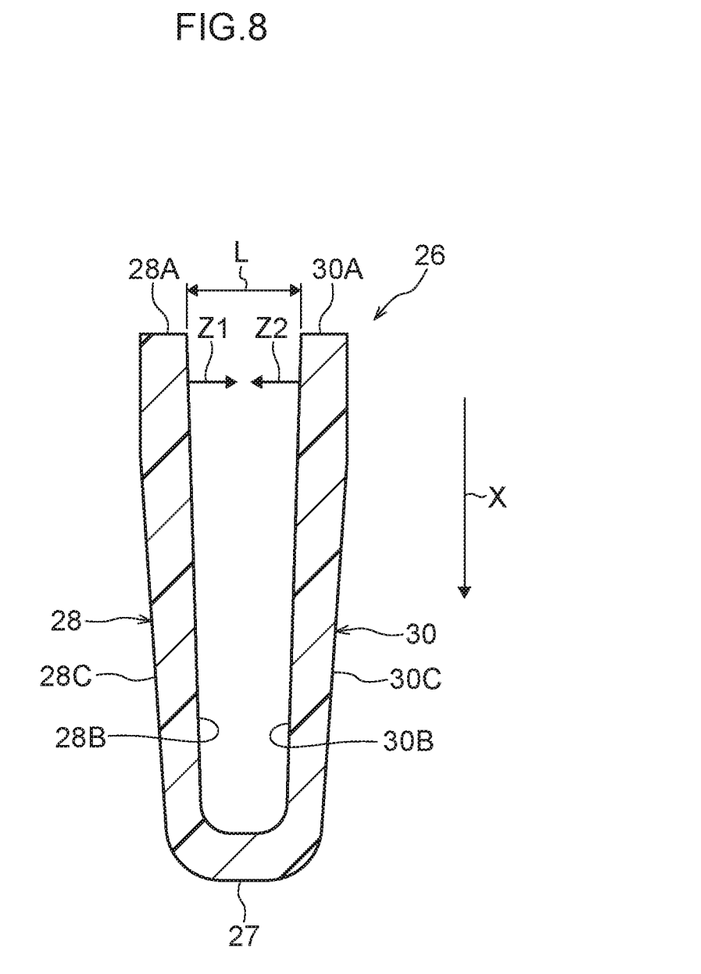
FIG. 8 is a sectional view along line 8-8 of FIG. 5.

As shown in FIG. 7, the projection 42 is provided on an inner surface 38A of the elastic plate-shaped portion 38 configuring part of the opposing surface 30B of the plate-shaped portion 30. As shown in FIG. 6, the projection 42 projects in a direction heading from the plate-shaped portion 30 toward the plate-shaped portion 28 (the opposing direction of the plate-shaped portion 30). Furthermore, the projection 42 is formed substantially in the shape of a chevron as seen from the clip width direction Y, and the angle of inclination that an inclined surface 42A on the clip insertion direction side forms with respect to the opposing surface 30B is greater than the angle of inclination that an inclined surface 42B on the opposite side forms with respect to the opposing surface 30B. It will be noted that the inclined surface 42A is an engaging surface that engages with the edge portion of the through hole 23 in the attachment portion 22B.

Furthermore, in the present embodiment, as shown in FIG. 9, the projection 40 and the projection 42 are disposed in such a way that their positions in the clip width direction are out of alignment with each other.

Moreover, as shown in FIG. 6 and FIG. 7, the attachment clip 26 is equipped with claw portions 44 and 46 serving as an example of engaging claw portions that are respectively provided on outer surfaces 28C and 30C of the plate-shaped portions 28 and 30 and engage with the edge portion of the attachment hole 25.

As shown in FIG. 7, the claw portion 44 is provided on an outer surface 34B of the elastic plate portion 34 configuring part of the outer surface 28C located on the opposite side from the opposing surface 28B. The claw portion 44 projects toward the opposite side from the opposing direction of the plate-shaped portion 28. Furthermore, the claw portion 44 is formed substantially in the shape of a chevron as seen from the clip width direction Y, and the angle of inclination that an inclined surface 44A on the clip insertion direction side forms with respect to the outer surface 28C is smaller than the angle of inclination that an inclined surface 44B on the opposite side forms with respect to the outer surface 28C. It will be noted that the inclined surface 44B is an engaging surface that engages with the edge portion of the attachment hole 25.

As shown in FIG. 7, the claw portion 46 is provided on an outer surface 38B of the elastic plate portion 38 configuring part of the outer surface 30C located on the opposite side from the opposing surface 30B. The claw portion 46 projects toward the opposite side from the opposing direction of the plate-shaped portion 30. Furthermore, the claw portion 46 is formed substantially in the shape of a chevron as seen from the clip width direction Y, and the angle of inclination that an inclined surface 46A on the clip insertion direction side forms with respect to the outer surface 30C is smaller than the angle of inclination that an inclined surface 46B on the opposite side forms with respect to the outer surface 30C. It will be noted that the inclined surface 46B is an engaging surface that engages with the edge portion of the attachment hole 25.

Furthermore, as shown in FIG. 1 and FIG. 9, the attachment clip 26 has projecting portions 48 that are provided on the opposing surface 28B of the plate-shaped portion 28 and project from clip width direction end portion sides of the plate-shaped portion 28 in the opposing direction of the plate-shaped portion 28. Specifically, in the present embodiment, the projecting portions 48 project from both clip width direction end portions of the plate-shaped portion 28.

As shown in FIG. 4 and FIG. 6, the projecting portions 48 are provided on the end portion 28A side (the free end portion side) of the plate-shaped portion 28 and extend along the direction in which the plate-shaped portion 28 extends. Furthermore, the pair of projecting portions 48 are configured to guide the outer surface (side surfaces) of the attachment portion 22B when inserting the attachment portion 22B between the pair of plate-shaped portions 28 and 30.

In a contact state in which the pair of projecting portions 48 provided on the plate-shaped portion 28 of the attachment clip 26 are in contact with the opposing surface 30B of the plate-shaped portion 30, a distance L between the end portions 28A and 30A (between the free end portions) of the pair of plate-shaped portions 28 and 30 is equal to or greater than a thickness T of the distal end portion 22C of the attachment portion 22B. It will be noted that it is more preferred that the distance L (see FIG. 8) between the end portions 28A and 30A (between the free end portions) of the pair of plate-shaped portions 28 and 30 be greater than the thickness T (see FIG. 3) of the distal end portion 22C of the attachment portion 22B.

Furthermore, in an inserted state in which the attachment portion 22B has been inserted between the pair of plate-shaped portions 28 and 30 of the attachment clip 26, the pair of projecting portions 48 provided on the plate-shaped portion 28 is separated from the opposing surface 30B of the plate-shaped portion 30. It will be noted that this configuration where the pair of projecting portions 48 are separated from the opposing surface 30B of the plate-shaped portion 30 in the inserted state includes: a configuration where, when the attachment portion 22B is inserted between the pair of plate-shaped portions 28 and 30, the plate-shaped portions 28 and 30 become pressed by the attachment portion 22B and open wider in such a way that the distance L increases, so that the pair of projecting portions 48 move separated from the opposing surface 30B of the plate-shaped portion 30; and a configuration where the pair of projecting portions 48 are separated from the opposing surface 30B of the plate-shaped portion 30 in a state in which the pair of plate-shaped portions 28 and 30 are free (a state in which the attachment portion 22B is not inserted between them). It will be noted that the attachment clip 26 of the present embodiment is configured in such a way that the distance L is larger in the inserted state than in the free state.

A coefficient of friction between the outer surface of the attachment clip 26 and the hole wall surface of the attachment hole 25 and a coefficient of friction between the inner surface of the attachment clip 26 and the outer surface of the attachment portion 22B are set smaller than a coefficient of friction between the outer surface of the attachment portion 22B and the hole wall surface of the attachment hole 25. Specifically, it is preferred that the attachment clip 26 be formed of a soft resin material. Examples of the resin material forming the attachment clip 26 include an engineering plastic such as polyacetal (POM).

Next, the action and effects of the member attachment structure 20 and the attachment clip 26 of the present embodiment will be described.

In the member attachment structure 20, when the attachment portion 22B of the plated component 22 is inserted from the end portions 28A and 30A side (the open side) between the pair of plate-shaped portions 28 and 30 of the attachment clip 26, the projections 40 and 42 respectively provided on the opposing surfaces 28B and 30B of the plate-shaped portions 28 and 30 are inserted into and engage with the through hole 23 in the attachment portion 22B. Because of this, the attachment clip 26 is attached to the plated component 22.

Next, when the distal end portion 27 of the attachment clip 26 is inserted into the attachment hole 25 and the distal end portion 27 passes through the attachment hole 25, the claw portions 44 and 46 respectively provided on the outer surfaces 28C and 30C of the pair of plate-shaped portions 28 and 30 engage with the edge portion of the attachment hole 25. Because of this, the attachment clip 26 is attached to the front member 24. That is, the plated component 22 and the front member 24 are attached to each other via the attachment clip 26.

In the member attachment structure 20, even if the force with which one's fingers pinch the pair of plate-shaped portions 28 and 30 is large when inserting the attachment portion 22B from the end portions 28A and 30A side (the open side) between the pair of plate-shaped portions 28 and 30 of the attachment clip 26, the distance L between the end portions 28A and 30A of the pair of plate-shaped portions 28 and 30 (the length of the open portion) is maintained as a result of the projecting portions 48 of the plate-shaped portion 28 coming into abutting contact with the plate-shaped portion 30. That is, in the member attachment structure 20, the distance L between the end portions 28A and 30A of the pair of plate-shaped portions 28 and 30 can be maintained compared to a configuration where the projecting portions are not provided on the plate-shaped portion. For this reason, it is easy to insert the attachment portion 22B between the pair of plate-shaped portions 28 and 30 of the attachment clip 26, and the ability of the attachment portion 22B and the attachment clip 26 to be attached to each other is improved.

Furthermore, when the attachment clip 26 is in the contact state, the distance L between the end portions 28A and 30A of the pair of plate-shaped portions 28 and 30 is equal to or greater than the thickness T of the distal end portion 22C of the attachment portion 22B, so it is easy to insert the attachment portion 22B between the pair of plate-shaped portions 28 and 30. Furthermore, in the present embodiment, the thickness T of the attachment portion 22B gradually increases from the distal end portion 22C toward the base portion 22D. For this reason, when the attachment portion 22B is inserted between the pair of plate-shaped portions 28 and 30 of the attachment clip 26, the distance L between the pair of plate-shaped portions 28 and 30 increases and the attachment portion 22B becomes sandwiched from both sides in its thickness direction by the repulsive force (restoring force) of the pair of plate-shaped portions 28 and 30. Because of this, the attachment portion 22B can be kept from rattling in a state in which the attachment clip 26 has been attached to the attachment portion 22B.

Moreover, in the inserted state, the pair of projecting portions 48 of the plate-shaped portion 28 of the attachment clip 26 are separated from the plate-shaped portion 30, so abnormal sounds can be effectively kept from being produced by the projecting portions 48 of the plate-shaped portion 28 coming into contact with the plate-shaped portion 30.

In the member attachment structure 20, when inserting the attachment portion 22B between the pair of plate-shaped portions 28 and 30, the projecting portions 48 guide the outer surface of the attachment portion 22B, so it is easy to insert the attachment portion 22B between the pair of plate-shaped portions 28 and 30. Furthermore, the hole wall surface of the attachment hole 25 and the outer surface of the attachment portion 22B can be kept by the projecting portions 48 from contacting each other, so abnormal sounds can be kept from being produced by contact. In particular, in the present embodiment, the projecting portions 48 are respectively provided on both clip width direction sides of the plate-shaped portion 28, so the attachment portion 22B can be kept from rattling and abnormal sounds can be kept from being produced by contact.

The projecting portions 48 of the attachment clip 26 are provided on the end portion 28A side (the free end portion side) of the plate-shaped portion 28, so compared, for example, to a configuration where the projecting portions are provided on the opposite side from the free end portion side of the plate-shaped portion (the distal end portion 27 side of the attachment clip 26), the distance L between the free end portions of the pair of plate-shaped portions 28 and 30—in other words, the length of the insertion opening (the entrance of the open portion) in the attachment clip—can be reliably maintained.

In the member attachment structure 20, when the claw portions 44 and 46 come into abutting contact with the hole wall surface of the attachment hole 25 when inserting the attachment clip 26 into the attachment hole 25, the elastic plate portions 34 and 38 flex in their opposing directions. After the claw portions 44 and 46 have passed through the attachment hole 25, the elastic plate portions 34 and 38 return to their original state because of repulsive force (restoring force), and the claw portions 44 and 46 engage with the edge portion of the attachment hole 25. Here, in the attachment clip 26, the cantilever-like elastic plate portions 34 and 38 elastically deformable in the plate thickness direction because of the slits 32 and 36 are respectively formed in the plate-shaped portions 28 and 30, and the claw portions 44 and 46 are formed on the elastic plate portions 34 and 38. For this reason, the claw portions 44 and 46 can be reliably caused to engage with the edge portion of the attachment hole 25 while reducing the force with which the attachment clip 26 is inserted into the attachment hole 25.

Furthermore, in the member attachment structure 20, the projections 40 and 42 are respectively provided on the elastic plate portions 34 and 38, so when inserting the attachment portion 22B between the pair of plate-shaped portions 28 and 30, the elastic plate portions 34 and 38 flex toward the opposite sides of the opposing directions of the plate-shaped portions 28 and 30 via the projections 40 and 42 that have come into abutting contact with the attachment portion 22B. After the projections 40 and 42 have reached the through hole 23 in the attachment portion 22B, the elastic plate portions 34 and 38 return to their original states because of repulsive force (restoring force), and the projections 40 and 42 engage with the edge portion of the through hole 23. Here, in the attachment clip 26, the projections 40 and 42 are formed on the elastic plate portions 34 and 38, so the projections 40 and 42 can be reliably caused to engage with the edge portion of the through hole 23 while reducing the force with which the attachment portion 22B is inserted into the attachment clip 26. Furthermore, the projections 40 and 42 are formed on the elastic plate portions 34 and 38 on which the claw portions 44 and 46 are provided, so the structure of the attachment clip 26 can be simplified compared, for example, to a configuration where the elastic plate portions are provided separately.

Furthermore, the attachment clip 26 is an integrally molded article made of resin, so it has superior insulation and resistance to corrosion. In particular, by forming the attachment clip 26 with an engineering plastic such as polyacetal (POM), for example, mechanical characteristics and vibration absorbability are also improved.

In the embodiment, the attachment clip 26 has a configuration where the projecting portions 48 are formed on both clip width direction end portions of the plate-shaped portion 28, but the present disclosure is not limited to this configuration. For example, the attachment clip 26 may also have a configuration where the projecting portion 48 is formed on an end portion of the plate-shaped portion 28 on one side in the clip width direction and where a projecting portion that projects toward the plate-shaped portion 28 is formed on an end portion of the plate-shaped portion 30 on the other side in the clip width direction. Furthermore, the attachment clip 28 may also have a configuration where projecting portions are formed on both the plate-shaped portion 28 and the plate-shaped portion 30.

Furthermore, in the embodiment, the member attachment structure 20 has a configuration where the plated component 22 and the front member 24 are attached to each other via the attachment clip 26, but the present disclosure is not limited to this configuration. For example, the plated component 22 and a rear member may also be attached to each other via the attachment clip 26, and the plated component 22 and another automobile exterior component may also be attached to each other via the attachment clip 26.

A mode of implementing the present disclosure has been described above by way of an embodiment, but the embodiment is an example and can be changed and implemented in a variety of ways to the extent that it does not depart from the gist of the present disclosure. Furthermore, it goes without saying that the scope of rights of the present disclosure is not limited to the embodiment.

All documents, patent applications, and technical standards mentioned in this specification are incorporated by reference herein to the same extent as if each individual document, patent application, or technical standard were specifically and individually indicated to be incorporated by reference.

What is claimed is:

1. A member attachment structure comprising:
   a first member on which an attachment equipped with an engaged portion is provided;
   a second member in which an attachment hole is provided and to which the first member becomes attached; and
   an attachment clip equipped with:
      a distal end that is inserted into the attachment hole,
      a pair of plates that are elastically deformable, extend from the distal end portion toward an opposite side from an insertion direction, have free ends located on the opposite side from the insertion direction, and are disposed opposing each other with the attachment being inserted therebetween,
      an engagement that is provided on an opposing surface of at least one plate of the pair of plates and that engages with the engaged portion,
      an engaging claw that is provided on an outer surface, located on an opposite side from the opposing surface, of the at least one plate and that engages with an edge of the attachment hole, and
      a projection that is provided on the opposing surface of the at least one plate and projects, in an opposing direction in which the pair of plates oppose each other, from an end side in a width direction orthogonal to a direction in which the at least one plate extends.

2. The member attachment structure according to claim 1, wherein, in a contact state in which the projection provided on one of the plates of the attachment clip is in contact with the other plate or the projection provided on the other plate, a distance between the free ends of the pair of plates is equal to or greater than a thickness of a distal end of the attachment.

3. The member attachment structure according to claim 1, wherein, in an inserted state in which the attachment has been inserted between the pair of plates of the attachment clip, the projection provided on one of the plates is separated from the other plate or the projection provided on the other plate.

4. The member attachment structure according to claim 1, wherein, when inserting the attachment between the pair of plates, the projection guides an outer surface of the attachment.

5. The member attachment structure according to claim 1, wherein the projection is provided on a free end side of the plate.

6. The member attachment structure according to claim 1, wherein a cantilever elastic plate, elastically deformable in a plate thickness direction because of slits, is formed in the at least one plate, and the engaging claw is provided on an outer surface of the elastic plate.

7. The member attachment structure according to claim 6, wherein:
the engaged portion is a through hole that runs through the attachment in a thickness direction thereof, and
the engagement is a projection provided on the opposing surface of the elastic plate.

8. The member attachment structure according to claim 1, wherein a coefficient of friction between an outer surface of the attachment clip and a hole wall surface of the attachment hole and a coefficient of friction between an inner surface of the attachment clip and an outer surface of the attachment are smaller than a coefficient of friction between the outer surface of the attachment and the hole wall surface of the attachment hole.

9. An attachment clip for attaching to each other a first member on which an attachment equipped with an engaged portion is provided and a second member in which an attachment hole is provided and to which the first member becomes attached, the attachment clip comprising:
a distal end that is inserted into the attachment hole;
a pair of plates that are elastically deformable, extend from the distal end portion toward an opposite side from an insertion direction, have ends located on the opposite side from the insertion direction, and are disposed opposing each other with the attachment being inserted therebetween;
an engagement that is provided on an opposing surface of at least one plate of the pair of plates and that engages with the engaged portion;
an engaging claw that is provided on an outer surface, located on an opposite side from the opposing surface, of the at least one plate and that engages with an edge of the attachment hole; and
a projection that is provided on the opposing surface of the at least one plate and projects, in an opposing direction in which the pair of plates oppose each other, from an end side in a width direction orthogonal to a direction in which the at least one plate extends.

* * * * *